No. 855,713. PATENTED JUNE 4, 1907.
L. J. LE PONTOIS.
SELF EXCITING ALTERNATOR.
APPLICATION FILED DEC. 11, 1905.
2 SHEETS—SHEET 1.
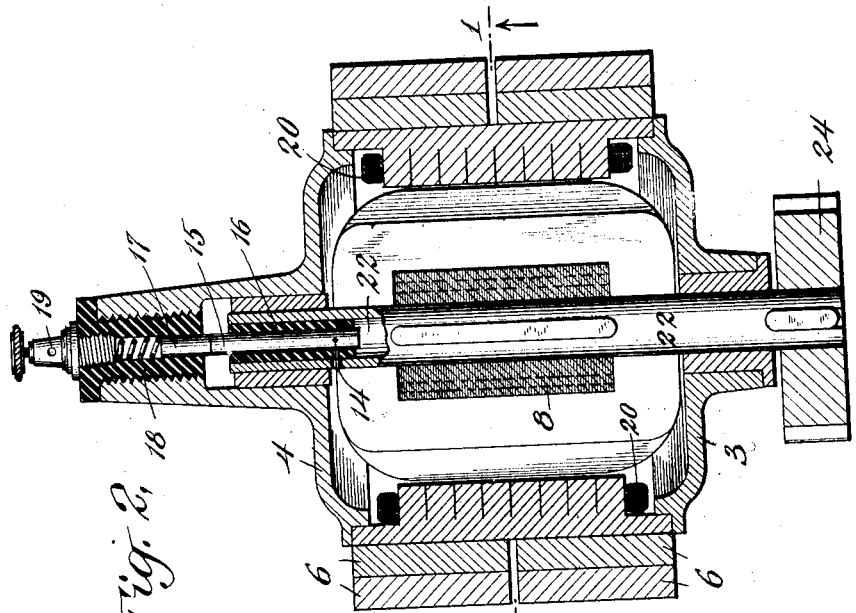
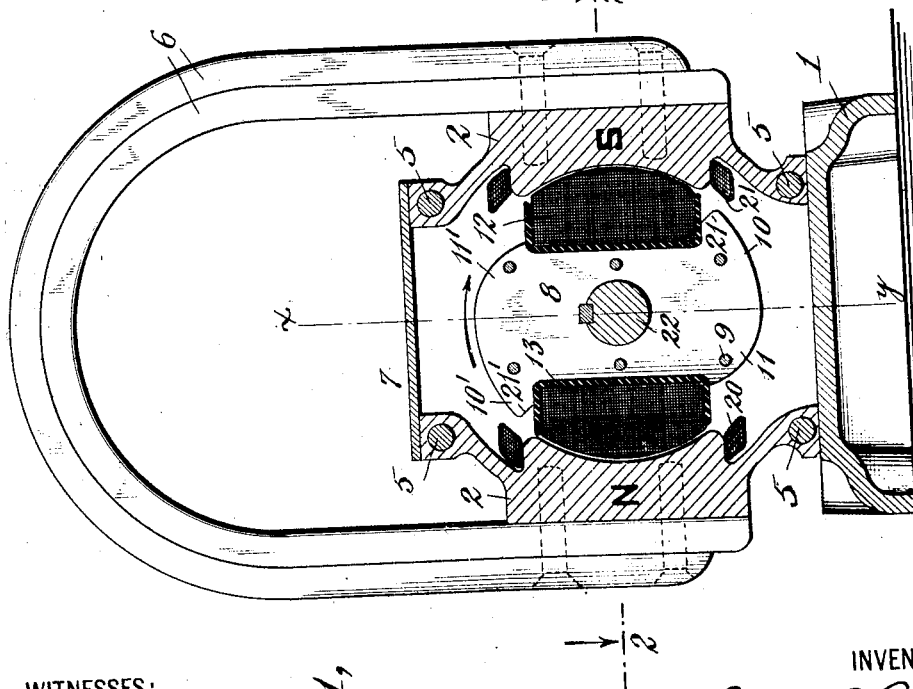
WITNESSES:
INVENTOR
Leon J. Le Pontois
BY
His ATTORNEYS

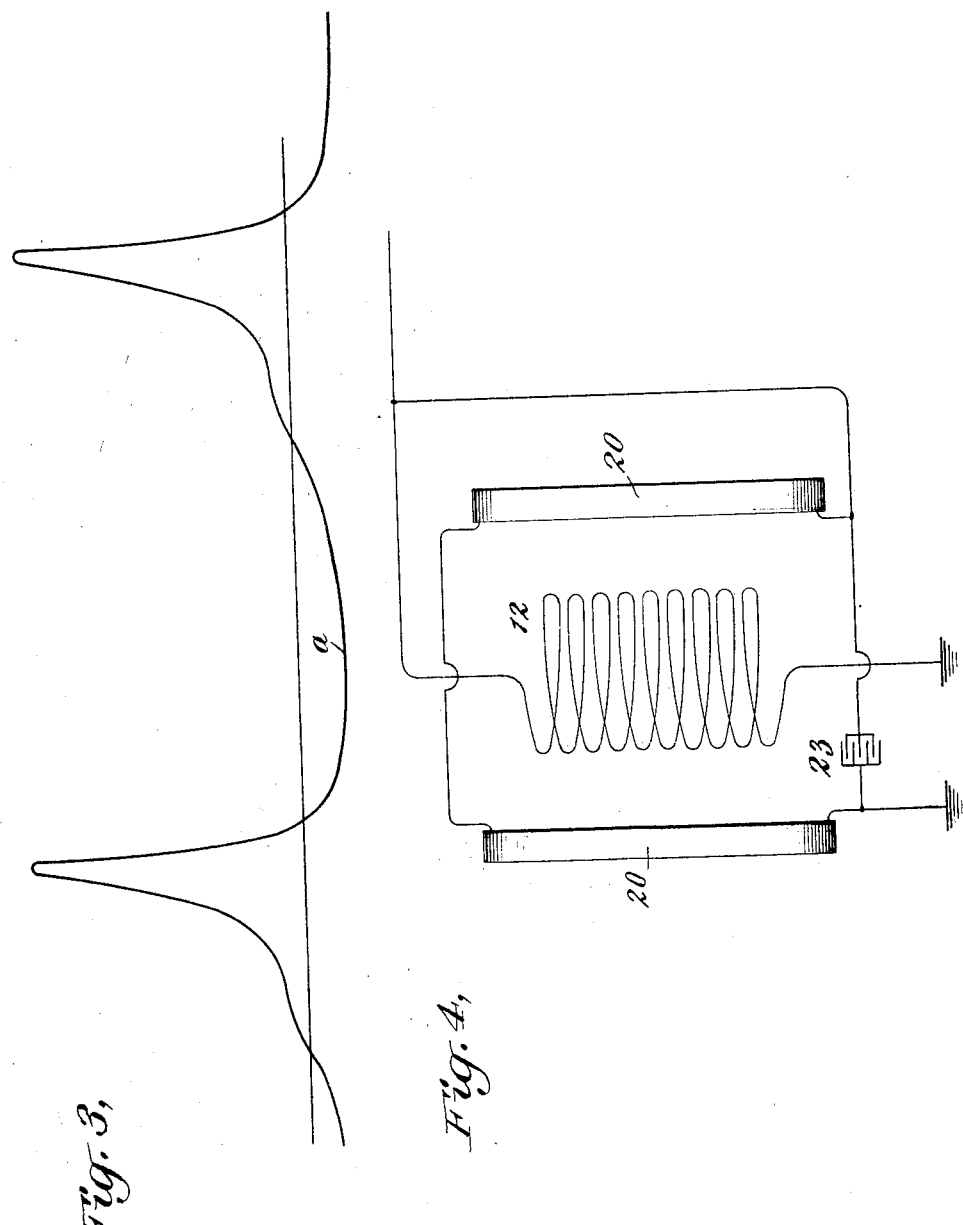

UNITED STATES PATENT OFFICE.

LEON J. LE PONTOIS, OF NEW ROCHELLE, NEW YORK, ASSIGNOR TO POLY-PHASE IGNITION SYSTEM COMPANY, A CORPORATION OF NEW YORK.

SELF-EXCITING ALTERNATOR.

No. 855,713.

Specification of Letters Patent.

Patented June 4, 1907.

Application filed December 11, 1905. Serial No. 291,262.

*To all whom it may concern:*

Be it known that I, LEON J. LE PONTOIS, a citizen of the Republic of France, and a resident of New Rochelle, Westchester county, New York, have invented certain new and useful Improvements in Self-Exciting Alternators, of which the following is a specification.

In my Patent 808,555 dated December 26, 1905, I have described an alternating current magneto of the inductor type designed primarily to deliver suitable currents to socalled spark coils used for the ignition of explosive mixtures by the jump spark system, said magneto presenting a very important feature, in that, without the use of rectifying means the alternating current generated was partially utilized in maintaining the so-called permanent magnets, constituting the field of the magneto to a really permanent degree of magnetization. Briefly stated, this result was obtained by constructing an iron inductor having dissymmetric polar faces. The rotation of this inductor in close proximity to magnetic poles surrounded by proper windings caused the alternating currents induced in these windings to reach different intensities because the rate at which the reluctance of the magnetic field threading through these windings was increased by the rotation of the inductor, was very much greater than the rate at which the reluctance of the same magnetic field was decreased. It is obvious that under the above conditions that one of the two currents reaching the higher value has precisely a magnetic action on the inducing field, and that that current having a lower value has a demagnetizing action on said field, the resultant action of both currents tending to strengthen the field or to maintain it at least to a fairly permanent state of magnetization.

The object of the present invention is to apply this same principle to the magnetization of the permanent magnets of the alternating type of shuttle wound Siemens' magneto. It is known that the rotating element of this type of magneto consists of an H-shaped armature properly wound with coils of suitable resistance, said armature being adapted to rotate between the poles of permanent horseshoe magnets.

The invention will be understood by reference to the accompanying drawings in which Figure 1 is a central vertical section on the plane of the line 1—1 of Fig. 2; Fig. 2 is a horizontal section on the plane of the line 2—2 of Fig. 1; Fig. 3 is a diagrammatic view representing approximately the shape of the peculiar alternating current waves generated by the present alternator; and Fig. 4 is a diagrammatic view of the circuit connections.

Similar reference numerals indicate similar parts throughout the several views.

Referring to the drawings the numeral 1 designates a base of suitable non-magnetic material upon which polar projections 2—2 are mounted said polar projections being formed of soft iron and slotted as shown in Fig. 2 to prevent eddy currents, and held rigidly apart from each other by two nonmagnetic end plates 3 and 4 through which pass suitable bolts 5. Permanent magnets 6, four being shown in the drawings, are secured by suitable means against the outer faces of the polar projections 2, developing thereby in those polar projections two magnetic poles N and S. A plate 7 bridges the upper part of the structure to properly inclose the armature in a dust proof case.

The armature 8 is preferably formed of a number of soft iron laminæ secured together by insulated rivets 9 and after being assembled are keyed to the shaft 22. The form of the armature will be readily understood by referring to the axial line $x$—$y$ in Fig. 1. The polar surfaces 10 and 10' oppositely located on each side of the axial line $x$—$y$ are substantially circular in shape, while the oppositely located polar surfaces 11 and 11' are not concentric. The polar surfaces 10 and 10' being substantially circular in shape the edges 21 and 21' will be radial in direction. From this it will be seen that as armature 8, starting from the position indicated in Fig. 1, is rotated in the direction of the arrow through an arc of 90 degrees the air gap formed between the poles N and S and the polar surfaces 11—11' of the armature, which is initially very large, will gradually decrease until the armature has completed its rotation through 90 degrees. It will follow, therefore, that the reluctance of the magnetic flux induced by the permanent magnets in the magnetic circuit, comprising themselves, the polar projections 2—2, the air gaps between the armature and said polar projections, and the armature, will decrease very gradually, attaining its minimum when the armature reaches a position at right angles to that shown. When the armature rotates from this latter position to the position shown in Fig. 1 the magnetic reluctance of the field will increase at a very slow rate up to the point where the polar surfaces 10—10' abruptly leave the edges of the poles N and S. It will be seen by the drawing that the air gap increases very suddenly with a slight angular motion of the armature.

Upon the armature 8 is wound a coil 12 in the usual manner and protected by suitable insulation 13. One terminal of the winding is grounded, the other terminal being led through an insulated bushing 14 to a conducting pin 15 secured in the hollow shaft 22 and insulated therefrom by a bushing 16. A brush 17 insulated from the cap 4 is pressed against revolving pin 15 by a spring 18 in electrical connection with a binding post 19.

From the above description it will be seen that an alternating current wave will be generated in the armature circuit while it rotates in the direction of the arrow from the position shown in Fig. 1 to a position at right angles thereto. During that period of rotation the intensity of the magnetic flux threading through the armature coil will increase progressively from zero to a maximum value, but as this increase is very gradual the current wave may be represented by the curve $a$ of Fig. 3. During the rotation of the armature from this last described position to that shown in Fig. 1 the magnetic flux threading through the armature coil will at first decrease very slowly, but as the armature approaches the edges of the poles N and S it will decrease abruptly causing thereby a sudden and rapid increase in the rate of change of the intensity of the magnetic flux threading through the coil 12 and a subsequent sudden rise in value of the current induced in the armature coil. It will be noticed that the field created in the armature by this induced current tends to increase the intensity of the total magnetic flux issuing from the permanent magnets, but owing to the fact that when that auxiliary field excitation takes place the axis of the armature forms a considerable angle with the axis of the permanent magnetic flux, the auxiliary magnetization is not felt as well by the permanent magnetic field as if the axis of both fields coincided. For this reason I locate two auxiliary field coils 20 on the edges of the poles N and S, which coils are in series with each other and are preferably connected in shunt across the armature circuit as shown in Fig. 4. In order to increase the magnetizing effect of these auxiliary coils upon the total field I advance the phase of the current flowing through said auxiliary coils by placing a condenser 23 in shunt with them thus causing the maximum current to take place while the armature edges 21 and 21' being in close proximity to the edges of the poles N and S presents a fairly good magnetic path for the auxiliary flux.

The shaft 22 may be driven from any suitable source of power through a gear 24.

What I claim and desire to secure by Letters Patent is:—

1. A partially self exciting alternator having a permanent magnetic field, polar projections of soft iron adjacent to the magnetic poles developed by said field, a rotor having dissymmetric polar faces adapted to rotate in close proximity to said poles, a winding on said rotor auxiliary coils wound around said soft iron polar projections said coils being connected in series with each other and in shunt with said rotor winding, whereby the waves of the alternating current generated which have a magnetizing effect on the permanent magnetic field reach a higher value than those which have a demagnetizing effect on said field and the magnetizing effect being increased by the location of the auxiliary windings in the magnetic circuit.

2. A partially self exciting alternator having a permanent magnetic field, polar projections of soft iron adjacent to the magnetic poles developed by said field, a rotor having dissymmetric polar faces adapted to rotate in close proximity to said poles, a winding on said rotor auxiliary coils wound around said soft iron polar projections said coils being connected in series with each other and in shunt with said rotor windings, and a condenser connected in shunt with said auxiliary coils, whereby the phase of the auxiliary magnetizing current is sufficiently advanced to enable the auxiliary magnetic field thus set up to exert its action on the main field while the rotor by its position in the field presents a path of sufficiently low magnetic reluctance.

In testimony whereof I have hereunto signed my name in the presence of two subscribing witnesses.

LEON J. LE PONTOIS.

Witnesses:
 OLIN A. FOSTER,
 GEORGE W. YOUNG.